(12) United States Patent
Ozen et al.

(10) Patent No.: US 11,609,933 B1
(45) Date of Patent: Mar. 21, 2023

(54) ATOMIC PARTITION SCHEME UPDATES TO STORE ITEMS IN PARTITIONS OF A TIME SERIES DATABASE

(71) Applicant: Amazon Technologies, Inc., Seattle, WA (US)

(72) Inventors: Mustafa Ozan Ozen, Vancouver (CA); Sandeep Bhatia, Bothell, WA (US); Lonnie J. Princehouse, Seattle, WA (US); Timothy A. Rath, Des Moines, WA (US); Gaurav Saxena, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 16/039,258

(22) Filed: Jul. 18, 2018

(51) Int. Cl.
  *G06F 16/00* (2019.01)
  *G06F 16/27* (2019.01)
  *G06F 16/21* (2019.01)
  *G06F 16/23* (2019.01)
  *G06F 16/2458* (2019.01)

(52) U.S. Cl.
  CPC .......... *G06F 16/278* (2019.01); *G06F 16/211* (2019.01); *G06F 16/2322* (2019.01); *G06F 16/2477* (2019.01)

(58) Field of Classification Search
  CPC .. G06F 16/278; G06F 16/2477; G06F 16/211; G06F 16/2322
  See application file for complete search history.

(56) References Cited

U.S. PATENT DOCUMENTS

| | | | |
|---|---|---|---|
| 6,003,036 A | 12/1999 | Martin | |
| 6,125,370 A * | 9/2000 | Courter | G06F 16/278 |
| | | | 707/999.005 |
| 7,043,491 B1 * | 5/2006 | Gong | G06F 16/254 |
| 7,752,622 B1 * | 7/2010 | Markov | G06F 9/4881 |
| | | | 718/103 |
| 7,792,879 B2 * | 9/2010 | Qi | G06F 12/023 |
| | | | 707/813 |
| 8,301,603 B2 | 10/2012 | Kan et al. | |
| 8,447,757 B1 * | 5/2013 | Cox | G06F 16/2471 |
| | | | 707/720 |
| 9,607,019 B1 * | 3/2017 | Swift | G06F 16/2255 |
| 10,503,737 B1 * | 12/2019 | Manville | G06F 16/2455 |
| 2002/0183972 A1 * | 12/2002 | Enck | G06F 11/3409 |
| | | | 702/186 |

(Continued)

OTHER PUBLICATIONS

Esling et al., "Time-Series Data Mining", Nov. 2012, ACM Computing Surveys, vol. 45, No. 1, Article 12, pp. 1-34 (Year: 2012).*

*Primary Examiner* — Alexander Khong
(74) *Attorney, Agent, or Firm* — S. Scott Foster; Kowert, Hood, Munyon, Rankin & Goetzel, P.C.

(57) ABSTRACT

Atomic partition scheme updates to partition items may be implemented by a time series database. A time threshold may be assigned to partition scheme update so that the time threshold may be applied across a set of ingestion nodes that may apply the partition scheme update the same. A request to store an item with a timestamp less than the time threshold may be stored in one partition of the time series database, while the item may be stored in a different partition of the time series database if the item has timestamp greater than or equal to the time threshold.

20 Claims, 8 Drawing Sheets

(56) References Cited

U.S. PATENT DOCUMENTS

| | | | |
|---|---|---|---|
| 2003/0061263 A1* | 3/2003 | Riddle | H04L 47/15 718/104 |
| 2007/0005297 A1* | 1/2007 | Beresniewicz | G05B 23/0235 702/181 |
| 2007/0033370 A1* | 2/2007 | Zohar | G06F 11/1435 711/173 |
| 2009/0313305 A1* | 12/2009 | Raichelgauz | G06F 16/40 |
| 2010/0057399 A1* | 3/2010 | Castelli | G06K 9/00523 702/179 |
| 2010/0057687 A1* | 3/2010 | Shen | G06F 16/3322 |
| 2011/0153603 A1 | 6/2011 | Adiba et al. | |
| 2012/0078951 A1* | 3/2012 | Hsu | G06F 16/24568 707/769 |
| 2013/0290249 A1* | 10/2013 | Merriman | G06F 16/273 707/610 |
| 2014/0115002 A1* | 4/2014 | Kocher | G06F 11/3013 707/776 |
| 2015/0135255 A1* | 5/2015 | Theimer | H04L 67/1004 726/1 |
| 2015/0341874 A1* | 11/2015 | Nguyen-Dang | H04W 52/0209 370/350 |
| 2015/0347555 A1* | 12/2015 | Vyas | G06F 16/113 707/662 |
| 2016/0019360 A1* | 1/2016 | Pahwa | G16H 10/60 705/3 |
| 2016/0092484 A1 | 3/2016 | Finkler | |
| 2017/0060988 A1* | 3/2017 | Kudo | G06F 16/285 |
| 2018/0349418 A1* | 12/2018 | Lee | G06F 11/1446 |
| 2020/0012647 A1* | 1/2020 | Johnson, III | G06F 16/24556 |
| 2021/0019316 A1* | 1/2021 | Pang | G06F 16/2456 |

* cited by examiner

ATOMIC PARTITION SCHEME UPDATES TO STORE ITEMS IN PARTITIONS OF A TIME SERIES DATABASE

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability. Thus, such techniques for distributing data in a database system, like distributing data across different partitions, may be highly desirable.

Figure 1:
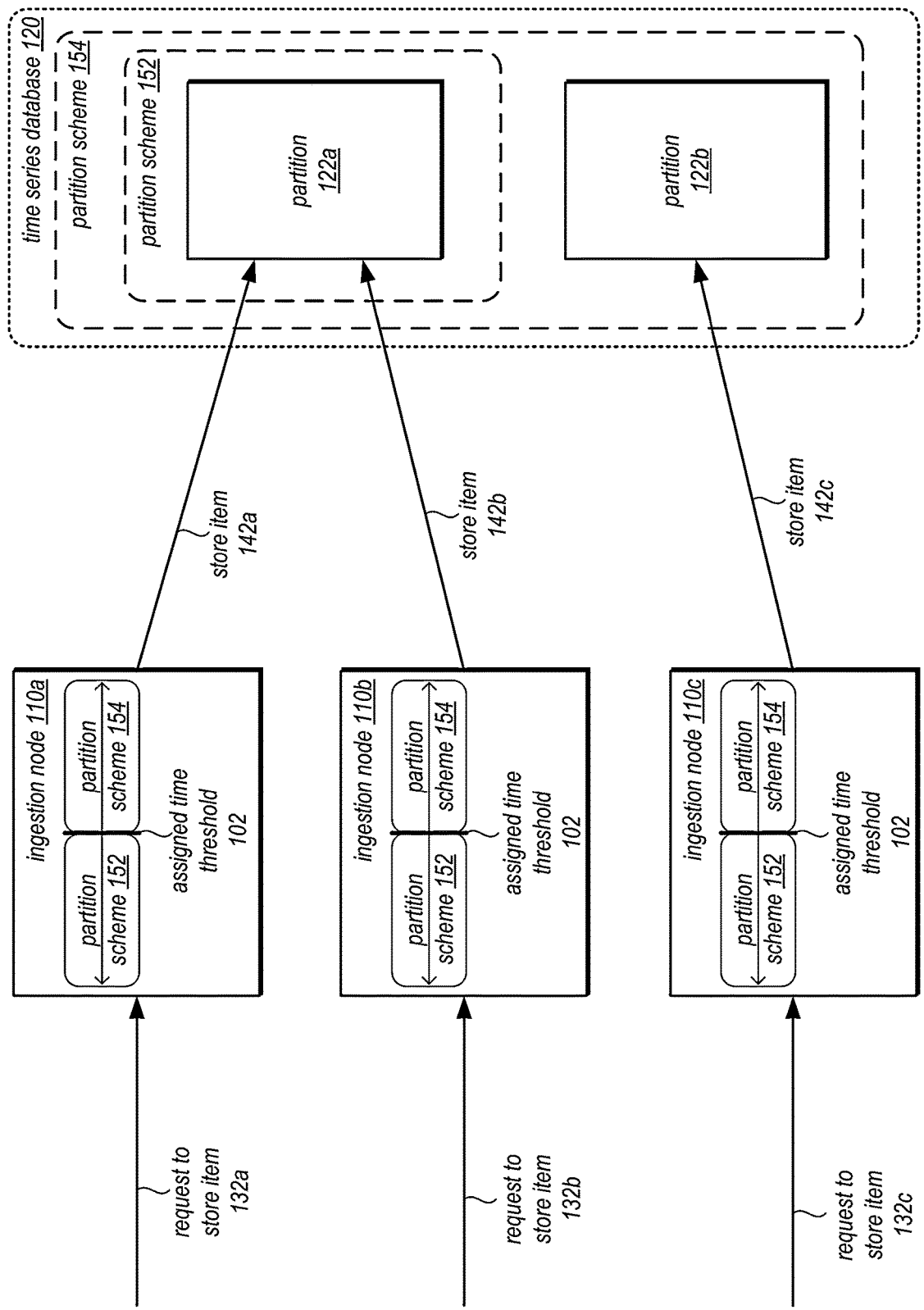
FIG. 1 is a logical block diagram illustrating atomic partition scheme updates to store items in partitions of a time series database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Atomic partition scheme updates to store items in partitions of a time series database may be implemented in various embodiments, as described herein. Distributed data storage systems, such as time series databases, may utilize partitions in various embodiments, in order to increase the availability, reliability and performance of the time series database. Partitions, for example, may allow for requests accessing multiple different items of data to parallelize the work among different partitions, in some embodiments. Partitions may allow for a greater number of resources for processing requests to be allocated to a smaller number of items (e.g., smaller partition size at a host system allows for allocation of more host system resources to processing access requests to the smaller partition), in some embodiments, and thus may improve the performance of distributed data storage systems, including time series database systems, to make data available by increasing the speed at which data can be accessed and/or increasing the capacity of the distributed data storage system to store more data.

A partition scheme may describe and/or implement how data is distributed amongst partitions of a time series database, in some embodiments. For example, hash-based distribution schemes may generate hash values according to one or more attributes of items in a time series of a time series database and store the items in a partition identified according to the hash value. Other types of partitioning schemes may be implemented instead of hash-based distribution schemes. Partition schemes may distribute data with similar attribute values in a same partition, in some embodiments, providing improved performance when accessing similar data with similar values as the number of partitions to access may be reduced.

As the workload on a time series database changes, the number, configuration, size, or other features of time series database partitions, and thus the partitioning scheme, may be changed in order to dynamically adjust to the workload, in some embodiments. Partition events may, for instance, scale, split, merge, combine, add, remove, or otherwise move data to partition(s) of a time series database, in some embodiments. The work to ingest or store new items in a time series may also be distributed in various embodiments, which may leverage the distributed processing capacity to increase the throughput and/or capacity for storing items into a time series database, and thus improve performance of storing or otherwise ingesting data into the time series database. Ingestion nodes, routers, or other components may thus make use of a partition scheme to store items in a correct partition of a time series database, in some embodiments. In order to ensure that changes to a partition scheme (e.g., made in order to dynamically adjust to the workload of a time series database) are applied across all ingestion nodes consistently, atomic partition scheme updates to store items in partitions of a time series database may be implemented, in some embodiments. In this way, a large number of ingestion nodes can apply a new partition scheme for a time series database together so that either all ingestion nodes (or none) apply the new partition scheme to requests to store items in the same way without regard to the individual ingestion node performing the store request (e.g., so that all ingestion nodes would store the item in the same partition instead of the scenario where different ingestion nodes would store the same item in a different partition, making it difficult to locate the item because of the partitioning scheme change). In this way, large numbers of ingestion nodes can be implemented to increase ingestion throughput and performance of a time series database while avoiding inconsistent application of partition scheme changes to items in a time series database, thus improving the performance of the time series database overall and a client application that sends data to be stored in the time series database (as the higher number of ingestion nodes may provide better ingestion performance), in some embodiments.

FIG. 1 is a logical block diagram illustrating atomic partition scheme updates to store items in partitions of a time series database, according to some embodiments. Ingestion nodes, such as ingestion nodes 110a, 110b, and 110c may respectively handle different requests to store items in time series database 120, such as requests to store items 132a, 132b, and 132c (and corresponding store item operations 142a, 142b, and 142c). Each ingestion node 110 may maintain an assigned time threshold 102 to indicate when a different partition scheme, such as partition schemes 152 or 154, is applied.

For example, a request 132a may be received with a timestamp value that is compared to assigned time threshold 102. If the timestamp is less than time threshold 102, then partition scheme 152 is applied and if not partition scheme 154 may be applied, in some embodiments. In some embodiments, a change in partition scheme may not affect a particular item store request (e.g., store item operation 142a may be performed to partition 122a whether partition scheme 152 or 154 is applied). However other partition requests may be routed differently. For instance, as partition 122b may only be included in partition scheme 154, request to store item 132c may have a timestamp greater than or equal to assigned time threshold 102 in order to reach a decision to store the item 142c in partition 122b.

Assigned time thresholds 102 may be determined and assigned to distinguish between partitions and/or partition schemes, in various embodiments, as discussed below with regard to FIGS. 4-5 and 7. The assigned time threshold may be assigned using a future value (e.g., a time amount added to a time associated with a partition event that indicates a change between partition schemes). The assigned time threshold and updates to the partition scheme may be propagated out to ingestion nodes before taking effect so that all ingestion nodes 110 may begin to use the updated partition scheme (e.g., partition scheme 154) once the assigned time threshold is surpassed by the timestamps of items to be stored. The time threshold may include a buffer amount of time for propagation (e.g., the time threshold may be a future time value when compared to a current time for the ingestion node when first applied) so that all ingestion nodes can be applied the updated partition scheme to a request to store an item no matter which ingestion node receives the request to store the item (e.g., atomically applying the change at all ingestion nodes for all requests to store 132).

Please note that previous descriptions of implementing atomic partition scheme updates to store items in partitions of a time series database are not intended to be limiting, but are merely provided as logical examples. For example, the number, size, type, and arrangement of partitions, time series, ingestion nodes, or time series databases may be different than those discussed above with regard to FIG. 1

This specification begins with a general description of a provider network that may implement a time series database service that may implement atomic partition scheme updates to store items in partitions of a time series database. Then various examples of a time series database service are discussed, including different components/modules, or arrangements of components/module, that may be employed as part of implementing the time database service, in one embodiment. A number of different methods and techniques to implement atomic partition scheme updates to store items in partitions of a time series database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
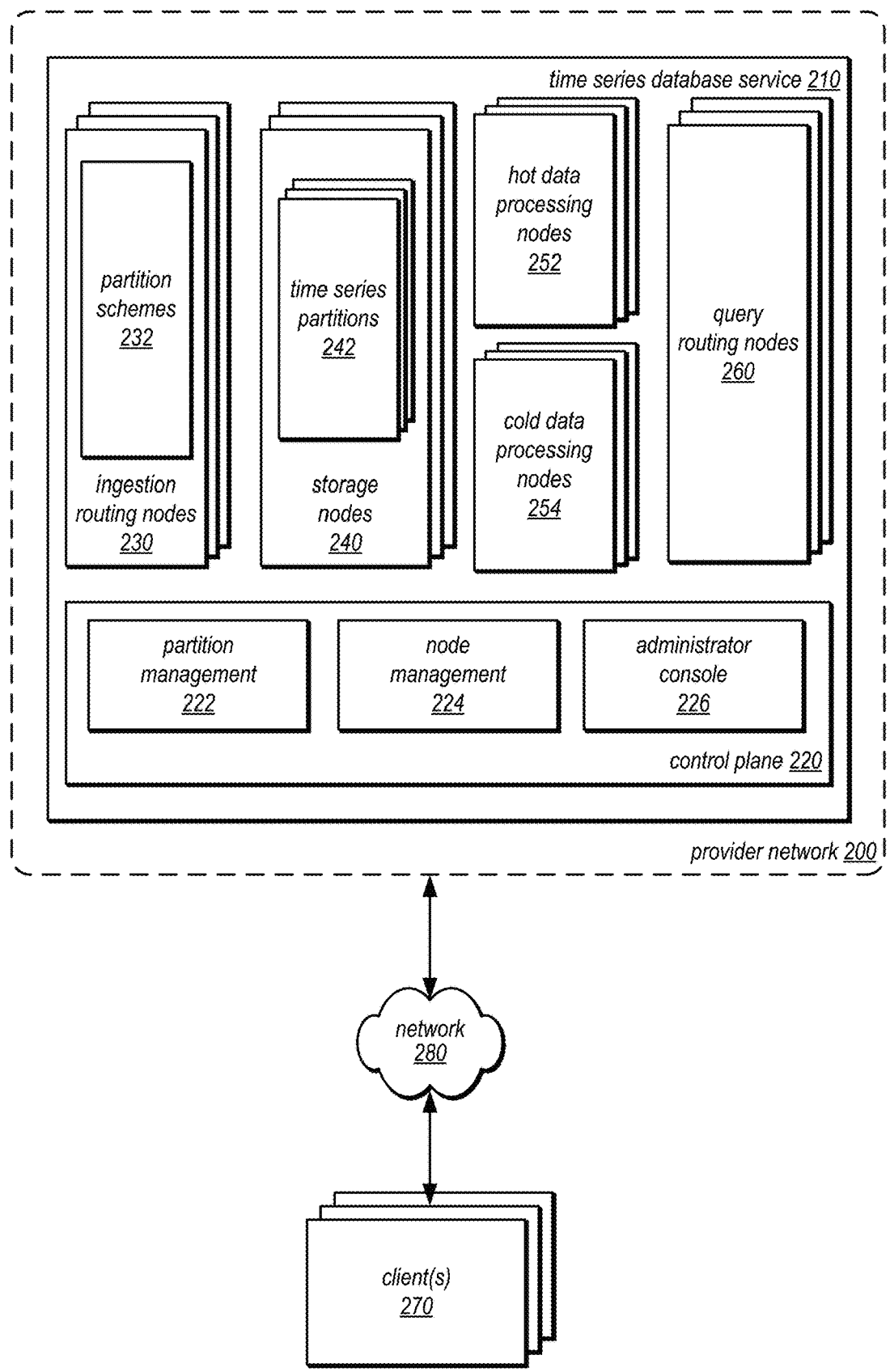
FIG. 2 is a logical block diagram illustrating a provider network offering a time series database service that may implement atomic partition scheme updates to store items in partitions of a time series database, according to some embodiments.

FIG. 2 is a logical block diagram illustrating a provider network offering a time series database service that may implement atomic partition scheme updates to store items in partitions of a time series database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In one embodiment, provider network 200 may implement various computing resources or services, such as time series database service 210 (e.g., a database service that indexes or otherwise provides accessed data modeled as time series of items (e.g., records)), and other services (not illustrated), such as a data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 8 and described below. In one embodiment, the functionality of a given system or service component (e.g., a component of time series database service 210) may be implemented by a particular node or may be distributed across several nodes. In some embodiments, a given node may implement the functionality of more than one service system component (e.g., more than one data store component).

Time series database service 210 may be implemented in one embodiment, to store items (e.g., records, objects, logs, etc.) as a time series in a time series database. Such a service may be an enterprise-class database system that is highly scalable and extensible. In one embodiment, access requests (e.g., requests to get/obtain items, put/insert items, delete items, update or modify items, scan multiple items) may be directed to a time series in time series database service 210 that is distributed across multiple physical resources according to a partition scheme, such as the partition schemes discussed above with regard to FIG. 1, and the database system may be scaled up or down on an as needed basis. In one embodiment, clients/subscribers may submit requests in a number of ways, e.g., interactively via graphical user interface (e.g., a console) or a programmatic interface to the database system. In one embodiment, time series database service 210 may provide a RESTful programmatic interface in order to submit access requests (e.g., to get, insert, delete, or scan data).

In one embodiment, clients 270 may encompass any type of client configurable to submit network-based requests to provider network 200 via network 280, including requests for time series database service 210 (e.g., to access item(s) in a series in time series database service 210). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a time series in time series database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture.

In some embodiments, clients of time series database service 210 may be implemented on resources within provider network 200 (not illustrated). For example, a client application may be hosted on a virtual machine or other computing resources implemented as part of another provider network service that may send access requests to time series database service 210 via an internal network (not illustrated).

In one embodiment, a client 270 may provide access to provider network 200 to other applications in a manner that is transparent to those applications. For example, client 270 may integrate with a database on time series database service 210. In such an embodiment, applications may not need to be modified to make use of a service model that utilizes time series database service 210. Instead, the details of interfacing to the time series database service 210 may be coordinated by client 270.

Client(s) 270 may convey network-based services requests to and receive responses from provider network 200 via network 280, in one embodiment. In one embodiment, network 280 may encompass any suitable combination of networking hardware and protocols necessary to establish network-based communications between clients 270 and provider network 200. For example, network 280 may encompass the various telecommunications networks and service providers that collectively implement the Internet. In one embodiment, network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Time series database service 210 may implement ingestion routing nodes 230, in some embodiments. Ingestion routing nodes 230 may perform requests to store items in a time series of a time series database hosted in time series database service 210. For example, a client 270 may send a request to store an item in a time series to a network address or other endpoint which may be received at a load balancer which may implement one or more load balancing schemes to direct the request to one of ingestion routing nodes 230, in some embodiments. For example, ingestion nodes may apply various kinds of hash or other distribution schemes to identify which partition an item belongs to. Because ingestion routing nodes 230 may not be limited or assigned to particular time series databases, in some embodiments, ingestion routing nodes 230 may maintain partition schemes 232 for storing items according to a partitioning scheme for the time series to which the item is to be added for any time series at any of the one or multiple time series databases that may be hosted by time series database service 210. As discussed below with regard to FIGS. 3-7, the partition schemes may be updated atomically in order to partition a time series database in a same manner at any of the ingestion routing nodes 230.

In some embodiments, time series database service 210 may also implement a plurality of storage nodes 240, each of which may manage one or more partitions 242 of a time series of a time series database on behalf of clients/users or on behalf of time series database service 210 which may be stored in storage (on storage devices attached to storage nodes 240 or in network storage accessible to storage nodes 240). In some embodiments, storage nodes 240 may implement an underlying data storage technology such as a database system, like a NoSQL or non-relational database system. Storage nodes 240 may be implemented as part of a separate database service of provider network 200 (not illustrated) and utilized as the underlying storage for time series database service 210, in some embodiments. For example, each partition of a time series database may be a separate table that is hosted in the separate database service.

Storage nodes 230 may implement request processing (not illustrated), in one embodiment. Request processing may perform various operations (e.g., read/get, write/update/modify/change, insert/add, or delete/remove) to access individual items stored in time series partitions 242 in time series database service 210, in one embodiment, either from ingestion routing nodes 230, or other nodes such as hot data processing nodes 252, cold data processing nodes 254 and/or query routing nodes 260, in some embodiments. In some embodiments, item request processing 232 may maintain database partitions 234 as a table according to a database model (e.g., a non-relational, NoSQL, or other time series database model where a timestamp supplied by a client application when submitting a request to store the item includes a timestamp value is the primary key and/or indexed value).

In some embodiments, time series database service 210 may implement query routing nodes 260 to parse and dispatch queries to one or multiple time series in a time series database to the appropriate query processing resources, such as hot data processing nodes 252 or cold data processing nodes 254. For instance, query routing nodes may recognize queries to recent data (e.g., less than a time value threshold) to host data processing nodes 252 which may maintain recent data in-memory in order to quickly perform queries (e.g., similar to a cache of items stored to a partition 242 in storage nodes 240), in some embodiments. For queries to older data (or more complex operations, such as cross time series joins, time series analysis operations, etc.), cold data processing nodes 254 may be utilized to access time series data in slower storage (e.g., either from storage nodes 240 or in a backup or archive store (not illustrated)).

In one embodiment, time series database service 210 may implement control plane 220 to implement one or more administrative components. In various embodiments, control plane 220 may direct the performance of different types of control plane operations among the nodes, systems, or devices implementing time series database service 210, in one embodiment. Control plane 220 may provide visibility and control to system administrators via administrator console 226, in some embodiment. Admin console 226 may allow system administrators to interact directly with time series database service 210 (and/or the underlying system). In one embodiment, the admin console 226 may be the primary point of visibility and control for time series database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a time series, at time series database service 210, in one embodiment.

Node management 224 may provide resource allocation, in one embodiment, for storing additional data in time series submitted to database time series service 210. For instance, node management 224 may communicate with storage nodes 240 to initiate the performance of various control plane operations (such as requests to update create time series, configure time series, etc.). In one embodiment, node management 224 may include a node recovery feature or component that handles failure events for ingestion nodes 230, storage nodes 240, hot data processing nodes 252, cold data processing nodes 254, and/or query routing nodes 260 (e.g., adding new nodes, removing failing or underperforming nodes, deactivating or decommissioning underutilized nodes, etc).

Various durability, resiliency, control, or other operations may be directed by control plane 220. For example, partition management 222 may detect split, copy, or move events for time series partitions at storage nodes 240 in order to ensure that the storage nodes 240 maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, partition management 222 may perform partition moves using a physical copying mechanism (e.g., a physical file system mechanism, such as a file copy mechanism) that copies an entire partition from one machine to another, rather than copying a snapshot of the partition data item by item. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, partition management 222 can move partitions amongst storage nodes 230 while the partitions being moved are still "live" and able to accept access requests.

In some embodiments, the partition moving process described above may be employed in partition splitting operations by partition management 222 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation). In some embodiments, a client application could request a partition operation (e.g., a split, move, merge, etc.) via control plane 220.

In some embodiments, each time series partition 242 may be identified by a partition ID, which may be a unique number (e.g., a GUID) assigned at the time the partition is created. When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by partition management 222, as discussed below with regard to FIG. 3, in various ways. For example, partition size and heat, where heat may be tracked by internally measured metrics (such as IOPS), externally measured metrics (such as latency), and/or other factors may be evaluated with respect to various performance thresholds, in some embodiments.

System anomalies may also trigger split or move events (e.g., network partitions that disrupt communications between replicas of a partition in a replica group, in some embodiments. Partition management 222 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Partition management 222 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Time series database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by time series database service 210 (and/or the underlying system) may be used to manipulate series-level entities, such as time series and indexes and/or to re-configure various time series. These APIs may be called relatively infrequently (when compared to data plane APIs). In some embodiments, the control plane APIs provided by the service may be used to create time series or at separate storage nodes, import time series, export time series, delete time series, perform various trend analysis or other time series evaluations, modify time series configurations or operating parameter for time series, and/or describe time series. The data plane APIs provided by time series database service 210 (and/or the underlying system) may be used to perform item-level operations, such as requests for individual items or for multiple items in one or more time series, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Figure 3:
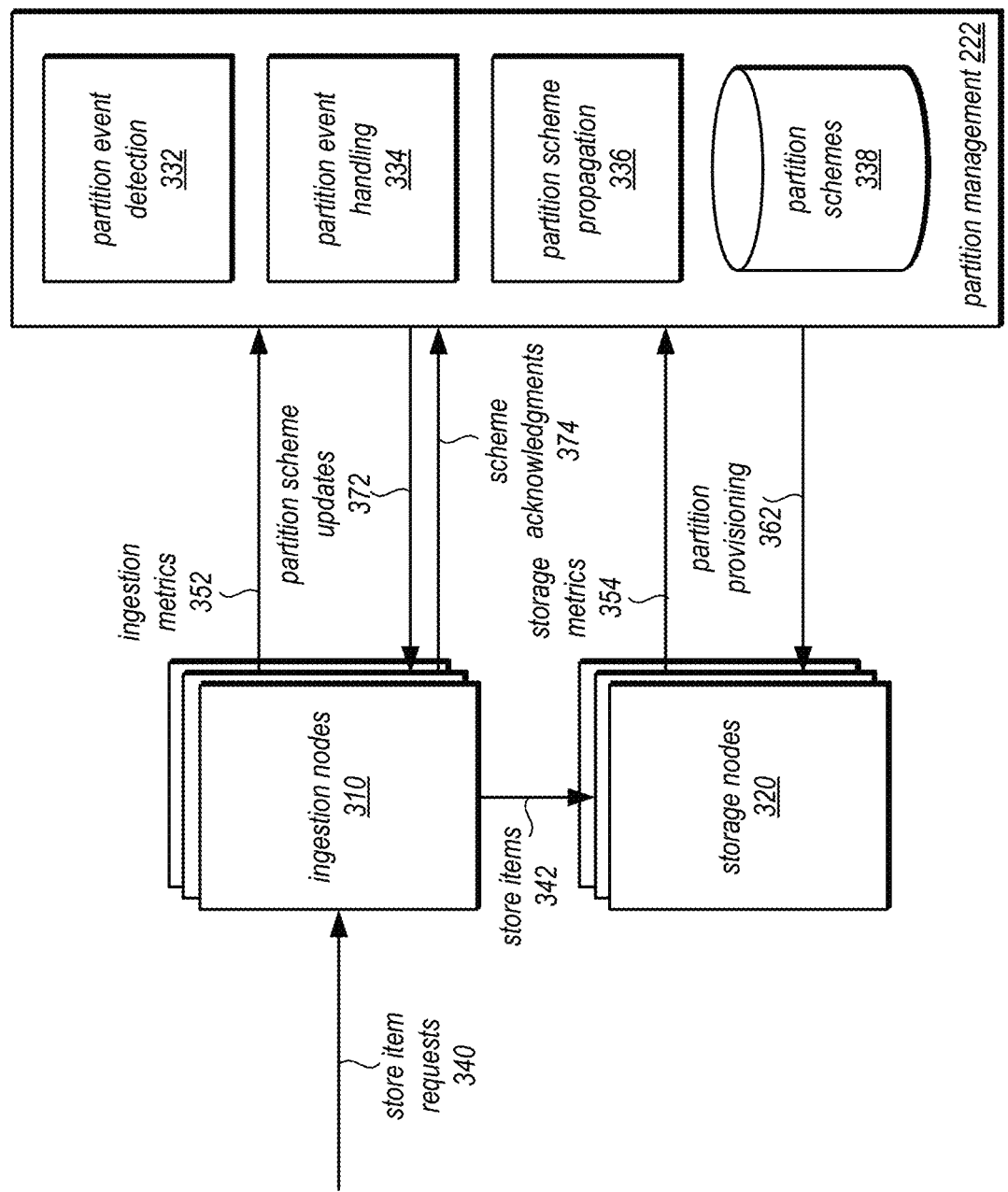
FIG. 3 is a logical block diagram illustrating interactions to update partition schemes, according to some embodiments.

FIG. 3 is a logical block diagram illustrating interactions to update partition schemes, according to some embodiments. Partition management 222, as noted above, may perform various operations to satisfy various performance criteria or service level agreements, specifications, guidelines, or other operational criteria for time series database service 210. Partition management 222 may implement partition event detection 332, in some embodiments. Partition event detection 332 may evaluate various metrics or other information collected for time series database service 210 in order to detect partition events, such as events to scale, add, remove, merge, split, or otherwise move data amongst one or more partitions of a time series database (e.g., for an individual time series), in some embodiments. For example, partition event detection 332 may receive ingestion metrics 352 from ingestion nodes 310 and storage metrics 354 from storage nodes 320 which may indicate various information such as network utilization, processing utilization, storage utilization, request queue time, request latency, partition specific utilization information, among other information.

Partition event detection 332 may compare the collected metrics with different event criteria or profiles (e.g., which may be or correspond to the various performance criteria discussed above) to detect if a type of partition event may be triggered for a time series database, in some embodiments. Different criteria, for instance, may be evaluated for events to scale, add, remove, merge, split, or otherwise move data, and thus over time detected partition events may adapt to the utilization of the time series database as a whole. In this way if store item requests 340 received at ingestion nodes cause operations to store items 342 that overheat a single storage node 320 storing an individual partition or underutilize multiple storage nodes 320 storing different partitions, then adjustments using a partition event as a trigger may rearrange the work more optimally, in some embodiments.

Partition management 222 may implement partition event handling 334 to perform the different partitioning events, in some embodiments. For instance, partition event handling 334 may perform operations 362 to create new tables storing partitions in storage nodes 320, remove tables, combine tables, split tables, or other data operations to achieve the desired partitioning specified according to the detected partition event. Partition event handling 334 may update or create a new version of a partitioning scheme, writing or recording appropriate changes to partition metadata or schemes 338, in some embodiments. In some embodiments, partition event handling 334 may trigger the propagation of partition scheme updates or new versions. For example, partition management 222 may implement partition scheme propagation 336 to provide updates or new versions of partition schemes to ingestion nodes 310. Partition scheme propagation 336 may assign time thresholds to the different updates, as discussed in detail below with regard to FIG. 7.

Partition scheme propagation 336 may implement various techniques for providing partition scheme updates 372 to ingestion nodes, in some embodiments. For example, partition scheme propagation 336 may operate using a push notification, allowing ingestion nodes to subscribe to a stream of updates (e.g., provided via a live connection to one of a fleet of partition scheme propagation nodes (not illustrated) so that updates may be sent as determined for a time series database). In some embodiments, a ping, health check, or other period push notification from partition scheme propagation 336 may be implemented so that ingestion nodes 310 may know that no further partition scheme updates are ready to be propagated, in some embodiments.

Pull-based propagation techniques could be implemented, in some embodiments. For example, ingestion nodes 310 may poll a partition scheme propagation node (or service) which may provide updates (or an indication that none are to be made periodically. In some embodiments, intermediary nodes (not illustrated) may pull partition scheme changes from a stream of partition scheme changes and provide them in response to an ingestion node request for partition scheme updates (e.g., using a hybrid push/pull model by utilizing an update stream for a database table that stores the partition scheme metadata to provide a push notification to the intermediary nodes of updates to partition schemes). In at least some embodiments, partition scheme data may be maintained in a separate store, partition scheme store 338, which may be a data store internal to time series database service 210 or another storage service (e.g., an object store) offered by provider network 200. When new ingestion nodes 310 are added (or come back from failure) a recent (but not necessarily current) set of partition schemes for one or multiple different time series databases may be retrieved from store 338 and then the updates to bring the set of partition schemes up to date may be replayed or otherwise provided to ingestion nodes in order to update the local copies, in some embodiments.

Figure 4:
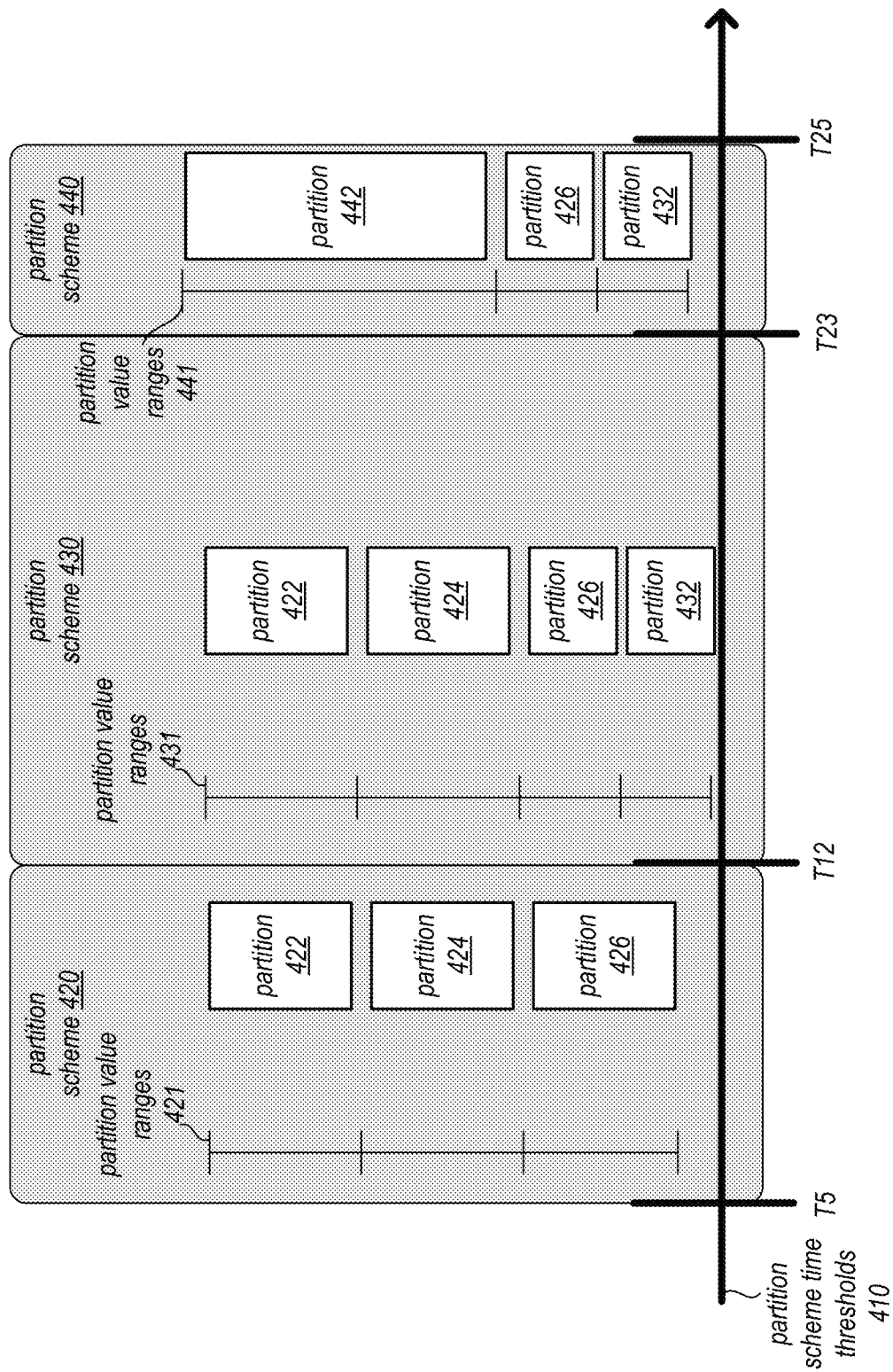
FIG. 4 is a logical block diagram of partition scheme versions identified according to different partition scheme time thresholds, according to some embodiments.
Figure 5:
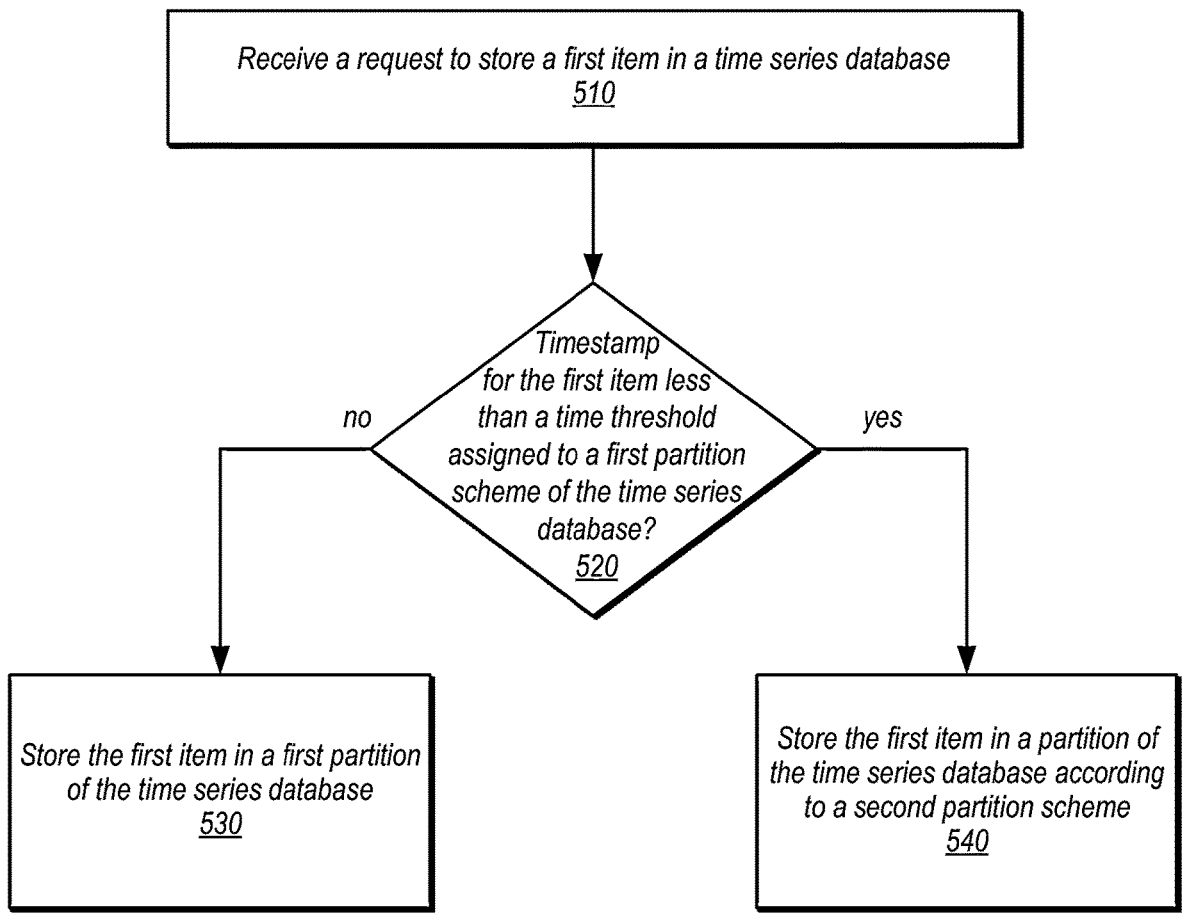
FIG. 5 is a high-level flowchart illustrating various methods and techniques to implement atomic partition scheme updates to store items in partitions of a time series database, according to some embodiments.

FIG. 4 is a logical block diagram of partition scheme versions identified according to different partition scheme time thresholds, according to some embodiments. Partition scheme time thresholds 410 may illustrate the various starting an ending time thresholds of different partition schemes applied to a time series database, in some embodiments. For example, partition scheme 420 may be applied to store requests for items with timestamps greater than or equal to T5 and less than T12, partition scheme 430 may be applied to store requests for items with timestamps greater than or equal to T12 and less than T23, partition scheme 440 may be applied to store requests for items with timestamps greater than or equal to T23 and less than T25, and so on.

Starting and ending time thresholds may, for instance be stored along with information such as partition value ranges 421, and the information for accessing, using, and/or interacting with partitions 422, 424, and 426 which may correspond to the different partition value ranges 421, in some embodiments. Hash values (e.g., generated from the timestamp for items) may be the partition value ranges in embodiments that utilize hash-based distribution, sharding, or other partitioning of a time series database. Other distribution schemes, including distribution upon secondary or other attribute values of items (e.g., source, geographic location, etc.) may be used for partition values that are mapped in partition value ranges (or values generated therefrom), in some embodiments.

As partition schemes change, new partition versions may be indicated by their applicable time thresholds. Partition scheme 430, for instance may include a change from partition scheme 420 that adds a new partition, partition 432. As illustrated in FIG. 4, partition value ranges 431 may be adjusted accordingly. Similarly in partition scheme 440, further partition scheme changes, such as the merger of partitions 422 and 424 into partition 442 may be performed, with again the corresponding updates made to partition value ranges 441. Please note that the partition metadata or partition scheme information maintained at ingestion nodes may include similar information as depicted in FIG. 4 for each time series in a time series database (and/or multiple time series databases), in some embodiments.

The examples of a time series database that implements atomic partition scheme updates to store items in partitions of a time series database as discussed in FIGS. 2-4 above have been given in regard to a time series database service. However, various other types of database systems that organize, store, or otherwise provide access to data that is stored according to time values (e.g., indexed based on timestamps) may implement atomic partition scheme updates to store items in partitions of a time series database, in other embodiments. FIG. 5 is a high-level flowchart illustrating various methods and techniques to implement atomic partition scheme updates to store items in partitions of a time series database, according to some embodiments. These techniques, as well as the techniques discussed with regard to FIGS. 6-7, may be implemented using components or systems as described above with regard to FIGS. 2-4, as well as other types of databases, storage engines, or distributed storage systems, and thus the following discussion is not intended to be limiting as to the other types of systems that may implement the described techniques.

As indicated at 510, a request to store a first item in a time series database may be received, in some embodiments. For example, the request may be submitted via an interface, such as an Application Programming Interface (API) and/or other protocol for interacting with the time series database or via a console or other graphical entry interface, in some embodiments. The item may be structured or represented according to a standardized, relational, or expected format (e.g., a certain number of fields, attributes, or columns in a record, in some embodiments. In some embodiments, the item may be semi-structured or represented according to an unexpected or unstandardized format (e.g., varying numbers of fields, attributes, or columns in a record). In some embodiments, a time value or other timestamp assigned to the item may be included in the item or received/determined separately for the item.

The time series database, as discussed above with regard to FIG. 1 may be a data store that stores items (e.g., records, objects, rows, or other data) that may be indexed or otherwise associated with a time value, in some embodiments. In this way, various time-based queries, analyses, operations, transformations, or other interactions with time series data (e.g., joins across multiple time series) may be supported. In at least some embodiments, a time series database may be a relational or other type of database that is implemented using various enabled database application extensions, schema criteria, or other modifications. Items may be stored in or as part of a time series so that users can query or otherwise interact with one or multiple time series in a time series database.

As indicated at 520, a timestamp for the first item may be evaluated with respect to a time threshold assigned to a first partition of the time series database, in some embodiments. The time threshold may be a time value or other indication of time that can be evaluated with respect to the timestamp of the first item (e.g., using Boolean comparisons, such as less than, equal to, or greater than). In some embodiments, conversions of the timestamp (e.g., all time to a single time zone, such as Coordinated Universal Time (UCT)) may be performed first before the comparison. The assigned time threshold may be stored as part of a partition scheme or other metadata for the time series database, in some embodiments. The time threshold may have been assigned to perform a partition of the time series database, in various embodiments, as discussed in more detail below with regard to FIG. 7 (e.g., as part of a different partitioning scheme). In at least some embodiments, the time threshold may be a time value that is later, yet to pass, or otherwise in the future with respect to a time at which the assignment of the time threshold (e.g., time of the partitioning event plus 3 minutes) is performed.

As indicated by the negative exit from 520, if the timestamp for the first item is less than the time threshold, then the first item may be stored in the first partition, in some embodiments, as indicated at 530. For example, the timestamp may indicate the application time for a partition (e.g., a split or merge) of the time series database (e.g., of a time series) so that any ingestion node or other component performing the techniques illustrated in FIG. 5, that receives a request to store an item can store the item consistently to the same partition, in some embodiments. Storing the first item may include writing the first item to a file, container, or other structure that holds items of a partition of the time series database, in some embodiments. In some embodiments, storing the first item may be performed by writing or causing the item to be inserted into an underlying database table, such as a NoSQL database table, that uses the timestamp as a primary key and corresponds to the partition of the time series database.

As indicated at 540, the first item may be stored in a second partition of the time series database if the timestamp is greater than or equal to the time threshold, in some embodiments. For example, the partition scheme for partitions of the time series to include the first item may identify the location, address, name, identifier, or other information needed to store the first item in the second partition (e.g., a table name for another underlying database table storing the second partition of the time series database), in some embodiments. For some items, the partitioning of the time series database may not alter the destination partition of the item, in some embodiments. An item whose hash value maps to a partition A before the time threshold may also still map to partition A after the time threshold as other hash values may have been split, merged, or otherwise reassigned to different partitions, in some scenarios.

Figure 6:
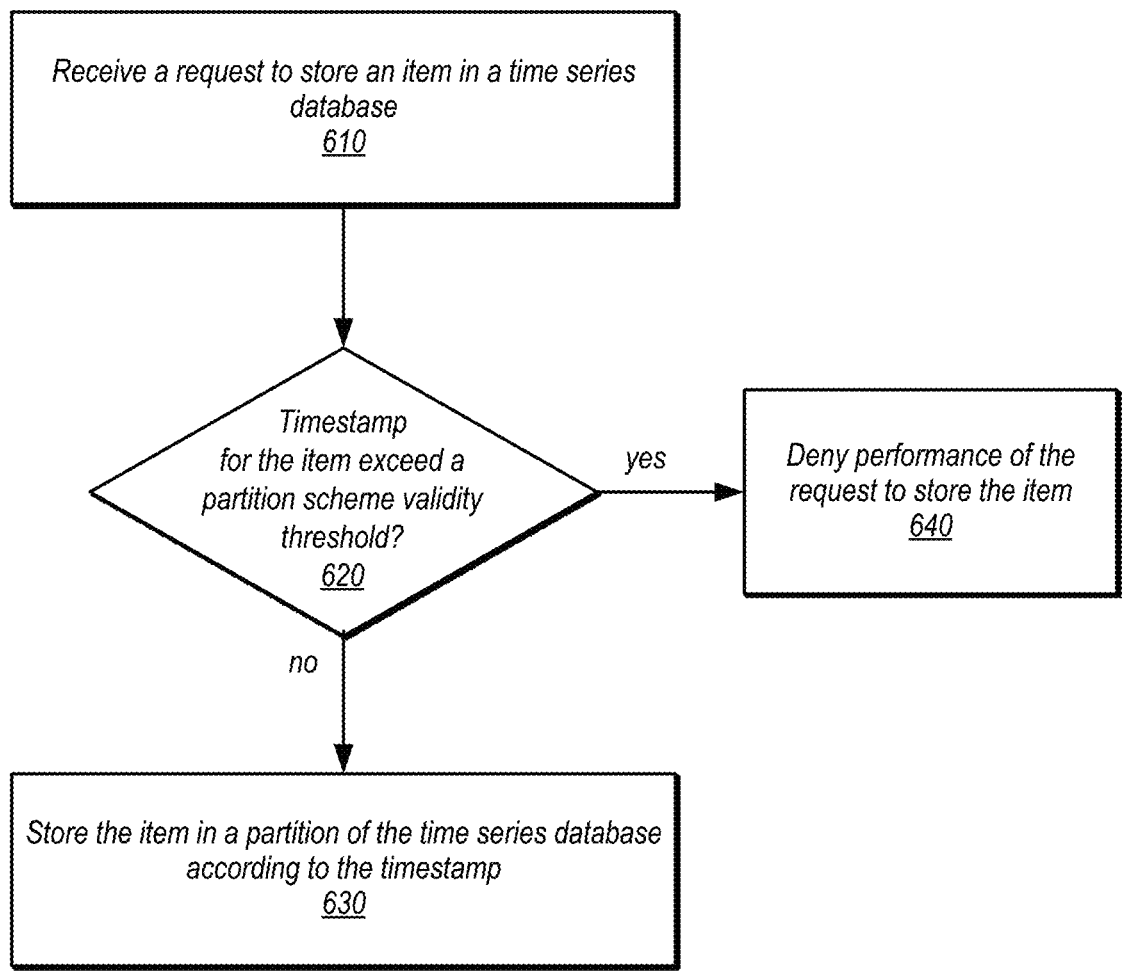
FIG. 6 is a high-level flowchart illustrating various methods and techniques to perform requests to store an item with a timestamp later than a current time of an ingestion node, according to some embodiments.

As timestamps may be assigned by client systems or applications of a time series database, timestamp values of the client could potentially move ahead in time (e.g., to be "later" than a current time of an ingestion node that is storing the item), in some embodiments (e.g., in scenarios where clock values for client systems and a time series database greatly diverge). In order to correctly store items in appropriate partitions of a time series database, different techniques for handling these future valued items may be implemented, in some embodiments. For example, items with timestamps that exceed or are otherwise later than a current time that are received to be stored could be buffered, cached, or otherwise queued for performance until the assigned timestamp is less than the current time, in one embodiment. FIG. 6 is a high-level flowchart illustrating various methods and techniques to perform requests to store an item with a timestamp later than a current time of an ingestion node, according to some embodiments.

As indicated at 610, a request to store an item in a time series database may be received, in some embodiments. As discussed above with regard to FIG. 5, this request may be received via an interface, may be structured or represented according to a standardized, relational, or expected format (e.g., a certain number of fields, attributes, or columns in a record or semi-structured or represented according to an unexpected or unstandardized format, and/or a time value or other timestamp assigned to the item may be included in the item or received/determined separately for the item, in some embodiments. As indicated at 620, a comparison of the timestamp with a partition scheme validity threshold for ingestion nodes may be performed, in some embodiments. As discussed above with regard to FIG. 4, an partition scheme validity threshold may be determined that would restrict, limit, or otherwise prevent requests to store items with timestamp values that could not be placed with confidence in a partition according to a partition scheme that was valid (e.g., later than a time for which updates (or the lack thereof) to the partition scheme for partitions of a time series database can be received, such as a current time of the ingestion node plus a time for communicating partitioning scheme changes to each node that might receive a store request for the time series database). For example, if an ingestion node may be updated with changes (or an indication that there are no changes) to partition scheme for a time series database periodically (e.g., every 3 minutes), then the timestamp of each store request may be compared with a threshold=current time+3 minutes. Please note that other times for scheme update propagation (or only the current time) may be used (e.g., based on an estimated clock value difference between client applications and ingestion nodes), in other embodiments.

As indicated by the negative exit from 620, if the timestamp does not exceed the partition scheme validity threshold for ingestion nodes, then the item may be stored in a partition of the time series database according to the timestamp, as indicated at 630, in some embodiments. If, as indicated by the positive exit from 630, the timestamp does exceed the partition scheme validity threshold for ingestion nodes, then performance for the request to store the item may be halted, stopped, or otherwise denied, in some embodiments, as indicated at 640. In some embodiments, an error indication may be sent in response to the request indicating the failure related to the timestamp for the item.

Figure 7:
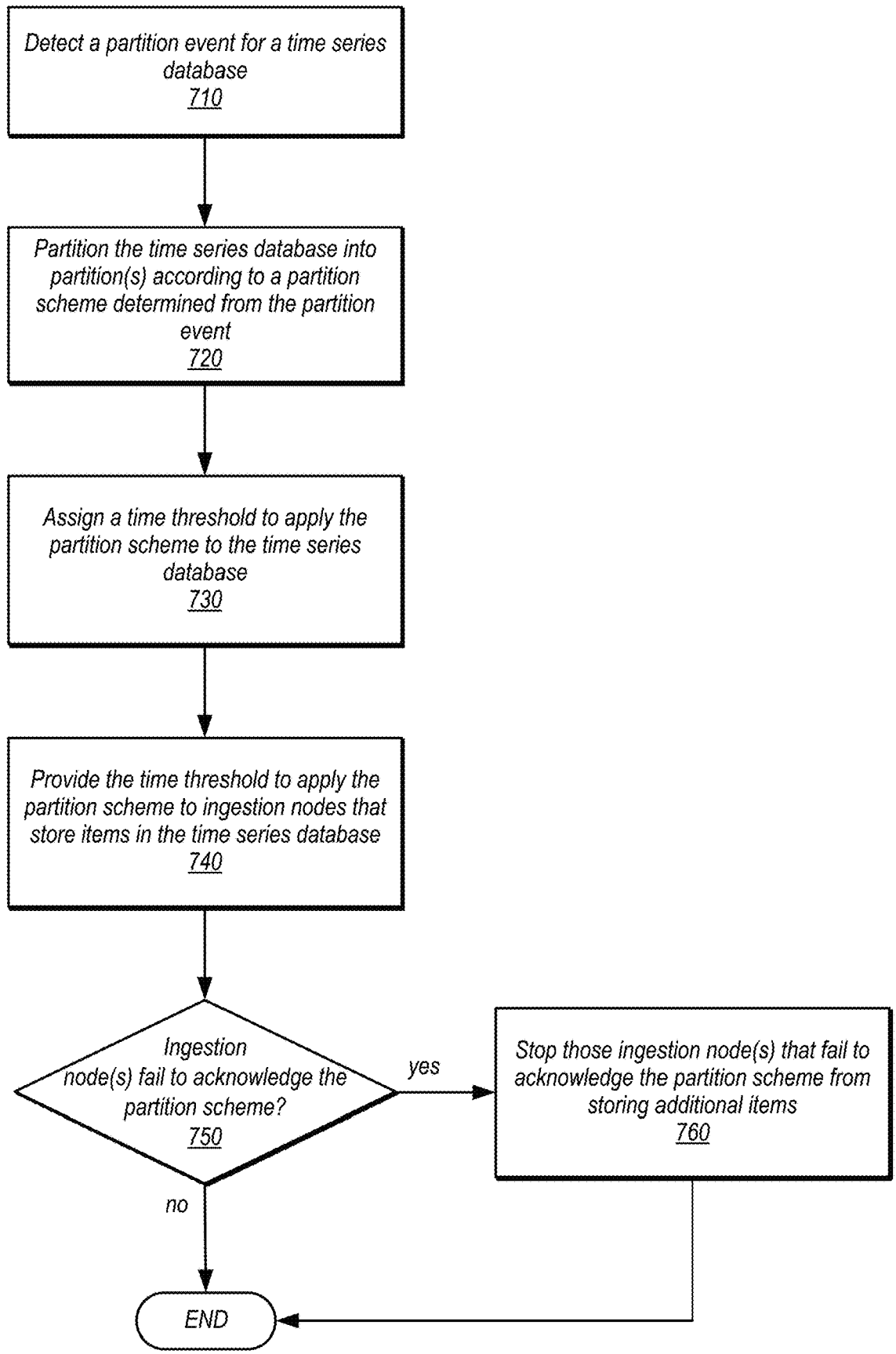
FIG. 7 is a high-level flowchart illustrating various methods and techniques to assign time thresholds to partition a time series database, according to some embodiments.

FIG. 7 is a high-level flowchart illustrating various methods and techniques to assign time thresholds to partition a time series database, according to some embodiments. As indicated at 710, a partition event for a time series database may be detected, in some embodiments. For example, performance information for various components of the time series database (e.g., ingestion nodes, storage nodes, or query nodes) may be evaluated with respect to one or more partition criteria, in some embodiments. Partition criteria for a scaling event may, for example, cause one (or more) partitions of a time series database to be created (e.g., split out of another partition or added to a partition) if utilization, heat, latency, or other one or more performance information (or combination of performance information) satisfies the scaling event criteria. The partitioning of the time series database may be changed (e.g., by modifying hash value ranges for hash-based partitioning) to create a new partitioning scheme (or new version of the partitioning scheme). Similar techniques may be implemented for detecting partition events for merging partitions.

As indicated at 720, the time series database may be partitioned into one or more partitions according to a partitioning scheme determined from the partition event, in some embodiments. If a particular partition should be split, added, or merged according to the detection criteria, then the resources, assignments, allocations, or other operations to make the partitioning of the time series database complete may be performed, in some embodiments. For instance, a new underlying database table may be created for a new partition, data copied or moved, data combined, new servers, hosts, or nodes assigned or removed from assignment, among other operations to partition the time series database according to the partitioning scheme.

As indicated at 730, a time threshold to apply the partition scheme to the time series database may be assigned, in some embodiments. For example, a standard future time value (e.g., +5 minutes) may be added to a time corresponding to the partition event (e.g., current time of the partition event), in some embodiments. In some embodiments, the amount of time to propagate the new partitioning scheme (and assigned time threshold) may be used to determine the future time value, in some embodiments. In some embodiments, the maximum time to perform the operations to effect or otherwise perform the partitioning of the time series database (e.g., as discussed above with regard to element 720) may be the future time value. In some embodiments, the future time threshold may differ from one partitioning event to another for the same time series database (or may differ between different time series databases). In at least some embodiments, machine learning or other statistical analysis may be performed to dynamically determine the time threshold to assign (e.g., by studying multiple criteria such as the variance of timestamps of previously received store requests, the propagation time and frequency of partitioning events, etc.).

As indicated at 740, the time threshold to apply the partition scheme may be provided to ingestions nodes that store items in the time series database, in some embodiments. For example, as discussed above with regard to FIG. 3, various push, pull, or notification/update techniques may be implemented to propagate changes (e.g., which may depend upon frequency of partitioning events or number of ingestion nodes), in some embodiments. The time threshold and scheme change may include routing or mapping information changes, such as hash value changes, the identity of new or additional nodes, or other information to affect the partition scheme change, in some embodiments.

In some scenarios, ingestion nodes with stale partitioning schemes (e.g., with expired or outdated time thresholds) could misdirect store requests to an incorrect partition. As indicated at 750, in some embodiments, ingestion node(s) that fail to acknowledge the partition scheme may be identified. For those ingestion nodes that fail to acknowledge the partitioning scheme, a control plane, load balancer, or other control plane component may stop the ingestion node(s) from storing additional items in the time series database, in some embodiments, as shown at 760. In some embodiments, the ingestion nodes may have a time to live (TTL) value for partition schemes so that if an update is not received or an indication that renews the partition scheme as still valid, the ingestion node may itself stop performing requests for those time series databases for which the partition scheme is no longer valid.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
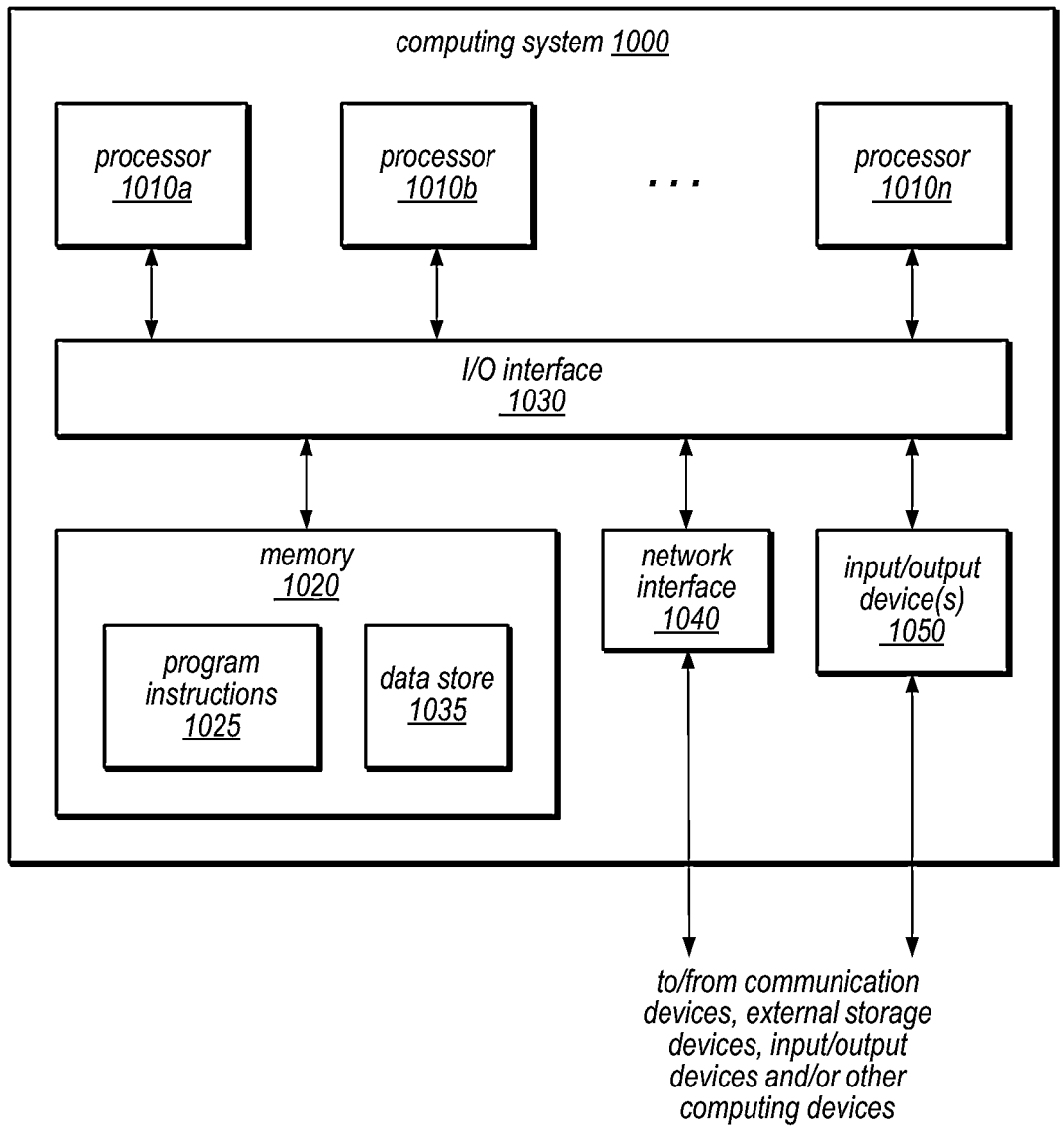
FIG. 8 is a block diagram illustrating an example computing system, according to some embodiments.

Embodiments to implement atomic partition scheme updates to store items in partitions of a time series database as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programming interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory that stores program instructions which, when performed by at least one processor, cause the at least one processor to perform a method to at least:

assign a future time threshold that indicates when a partition scheme is to be applied to a time series database, wherein the assigned future time threshold is determined based, at least in part, on an amount of time to propagate the future time threshold to a plurality of ingestion nodes that store items in the time series database;

responsive to a request to store a first item in the time series database:

store the first item in a first partition of the time series database if a timestamp for the first item is before the future time threshold; and store the first item in a second partition of the time series database if the timestamp for the first item is after or equal to the future time threshold.

2. The system of claim 1, wherein the at least one processor implements a control plane and the plurality of ingestion nodes, wherein the control plane performs the assignment of the future time threshold, and wherein one of the ingestion nodes stores the first item, and wherein the program instructions cause the at least one processor to further perform the method to at least:

provide, by the control plane, the future time threshold to the plurality of ingestion nodes.

3. The system of claim 1, wherein to assign the future time threshold to apply the partition scheme to the time series database, the program instructions cause the at least one processor to perform the method to at least add a future time value to a time corresponding to an event that causes the application of the partition scheme to the time series database.

4. The system of claim 1, wherein the at least one processor is implemented as part of a time series database service offered by a provider network, wherein the request to store the item is received via an interface for the time series database, wherein the request to store the item is routed to one of a plurality of ingestion nodes implemented as part of the time series database service, and wherein the plurality of ingestion nodes received the future time threshold and partition scheme to apply.

5. A method, comprising:

assigning a future time threshold that indicates when a partition scheme is to be applied to a time series database, wherein the assigned future time threshold is determined based, at least in part, on an amount of time to propagate the future time threshold to a plurality of ingestion nodes that store items in the time series database;

responsive to a request to store a first item in the time series database:

storing the first item in a first partition of the time series database if a timestamp for the first item is before the future time threshold that is assigned to the application of the partition scheme to the time series database; and storing the first item in a second partition of the time series database if the timestamp for the first item is after or equal to the future time threshold assigned to the application of the partition scheme to the time series database.

6. The method of claim 5, further comprising:

detecting a partition event for the time series database based on a workload of the time series database; and performing a partitioning of the time series database according to the partitioning event, wherein the partitioning is indicated by the partition scheme.

7. The method of claim 6, wherein assigning the future time threshold to apply the partitioning scheme that indicates the partitioning comprises adding a future time value to a time corresponding to the partition event.

8. The method of claim 7, wherein the future time value is determined based, at least in part, on an amount of time to perform the partitioning of the time series database.

9. The method of claim 7, wherein the request to store the first item is received at an ingestion node of the plurality of ingestion nodes, and wherein the storing of the first item is performed by the ingestion node.

10. The method of claim 6, wherein the request to store the first item is received at an ingestion node, wherein the storing of the first item is performed by the ingestion node, and wherein the method further comprises:

providing the future time threshold to the ingestion nodes; and stopping at least one of the ingestion nodes that fails to acknowledge the future time threshold from storing additional items.

11. The method of claim 5, wherein the future time threshold is determined according to a first time corresponding to the detection of a first event to perform the partitioning of the time series database and a first future time value added to the first time;

wherein the method further comprises:

receiving a second future time threshold to perform a second partitioning of the time series database, wherein the second future time threshold is determined according to a second time corresponding to the detection of a second event to perform the second partitioning and a second future time value added to the time, wherein the second future time value is different than the first future time value; and responsive to a request to store a second item in the time series database, storing the second item in the first partition, second partition, or a third partition of the time series database according to a comparison of a timestamp for the second item and the second future time threshold.

12. The method of claim 5, further comprising:

responsive to a second request to store a second item in the time series database, denying performance of the second request to store the second item according to a determination that a timestamp for the second item exceeds a partition scheme validity threshold.

13. The method of claim 5, wherein the second partition is created as a result of a split partition event detected for the first partition of the time series database.

14. A non-transitory, computer-readable storage medium, storing program instructions that when executed by one or more computing devices cause the one or more computing devices to implement:

receiving a future time threshold that indicates when a partition scheme is to be applied to a time series database, wherein the future time threshold is determined based, at least in part, on an amount of time to propagate the future time threshold to a plurality of ingestion nodes that store items in the time series database;

receiving a request to store a first item in the time series database, and in response:

storing the first item in a first partition of the time series database if a timestamp for the first item is before the future time threshold; and storing the first item in a second partition of the time series database if the timestamp for the first item is after or equal to the future time threshold.

15. The non-transitory, computer-readable storage medium of claim 14, wherein the request to store the first item is received at an ingestion node of the plurality of ingestion nodes, and wherein the storing of the first item is performed by the ingestion node.

16. The non-transitory, computer-readable storage medium of claim 14,
wherein the future time threshold is determined according to a first time corresponding to the detection of a first event to perform a first partitioning of the time series database and a first future time value added to the first time;
wherein the program instructions cause the one or more computing devices to further implement:
receiving a second future time threshold to perform a second partitioning of the time series database, wherein the second future time threshold is determined according to a second time corresponding to the detection of a second event to perform the second partitioning and a second future time value added to the time, wherein the second future time value is different than the first future time value; and
responsive to a request to store a second item in the time series database, storing the second item in the first partition, second partition, or a third partition of the time series database according to a comparison of a timestamp for the second item and the second future time threshold.

17. The non-transitory, computer-readable storage medium of claim 14, wherein the program instructions cause the one or more computing devices to further implement:
responsive to a second request to store a second item in the time series database, denying performance of the second request to store the second item according to a determination that a timestamp for the second item exceeds a partition scheme validity threshold.

18. The non-transitory, computer-readable storage medium of claim 14, wherein the program instructions cause the one or more computing devices to further implement:
receiving a second request to store a second item in the time series database;
storing the second item in the first partition of the time series database if a timestamp for the second item is less than the future time threshold; and
storing the first item in the first partition of the time series database if the timestamp for the second item is greater than or equal to the future time threshold.

19. The non-transitory, computer-readable storage medium of claim 14, wherein the second partition is created as a result of a merge partition event detected for the time series database that combines the first partition with a third partition of the time series database.

20. The non-transitory, computer-readable storage medium of claim 14 wherein the one or more computing devices implement one of a plurality of ingestion nodes as part of a time series database service offered by a provider network, wherein the request to store the item is received via an interface for the time series database, wherein the request to store the item is routed to the one ingestion node, and wherein the plurality of ingestion nodes received the future time threshold and partition scheme to apply.

* * * * *